US005852357A

United States Patent [19]

D'Souza

[11] Patent Number: 5,852,357

[45] Date of Patent: *Dec. 22, 1998

[54] SYSTEM AND METHOD FOR CONTROLLING AN ALTERNATING CURRENT (AC) SIGNAL

[75] Inventor: Stanley A. D'Souza, Phoenix, Ariz.

[73] Assignee: Microchip Technology Incorporated, Chandler, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 760,262

[22] Filed: Dec. 5, 1996

[51] Int. Cl.[6] .............................. G05F 1/10; G05B 24/02

[52] U.S. Cl. ......................... 323/239; 323/241; 323/322; 323/324

[58] Field of Search .................................... 323/319, 320, 323/323, 322, 324, 237, 239, 235, 241

[56] References Cited

U.S. PATENT DOCUMENTS

| | | | |
|---|---|---|---|
| Re. 33,184 | 3/1990 | Westfall et al. | 323/243 |
| 4,331,914 | 5/1982 | Huber | 323/324 |
| 4,358,729 | 11/1982 | Hart | 323/322 |
| 4,453,123 | 6/1984 | Erkman | 323/324 |
| 4,687,985 | 8/1987 | Pitel | 323/323 |
| 4,928,055 | 5/1990 | Kaieda et al. | 323/300 |
| 5,627,742 | 5/1997 | Nakata et al. | 323/235 |

*Primary Examiner*—Peter S. Wong
*Assistant Examiner*—Bao Q. Vu
*Attorney, Agent, or Firm*—Harry M. Weiss; Jeffrey D. Moy; Harry M. Weiss & Associates, P.C.

[57] ABSTRACT

A system for controlling an Alternating Current (AC) signal to an AC powered device. The system uses a microcontroller to monitor the cycles of the AC signal supplied to the AC powered device. By utilizing cycle counting, the microcontroller can supply various numbers of waveforms to the AC powered device in order to adjust the speed and/or energy supply level to the AC powered device. At full power, all the cycles of the AC signal are provided to the AC powered device. If the speed and/or energy supply level of the AC powered device needs to be reduced by half, the microcontroller supplies every other cycle of the AC signal to the AC powered device.

20 Claims, 1 Drawing Sheet

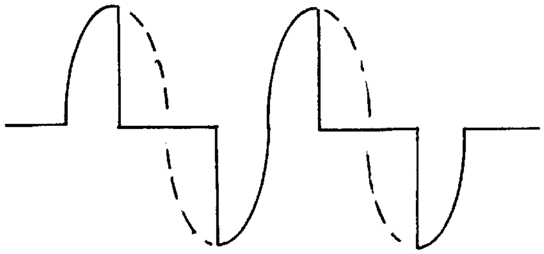
Fig. 1 (PRIOR ART)
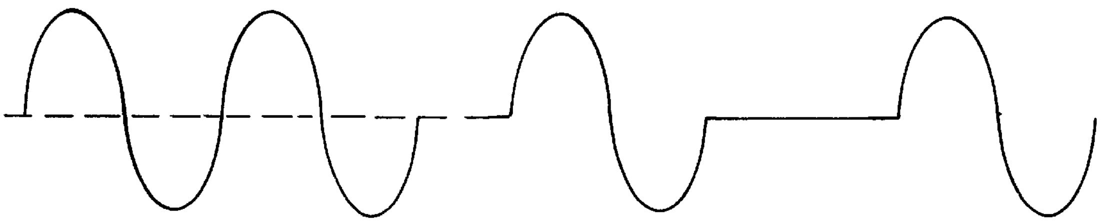
Fig. 2a (FULL POWER) Fig. 2b (HALF POWER)
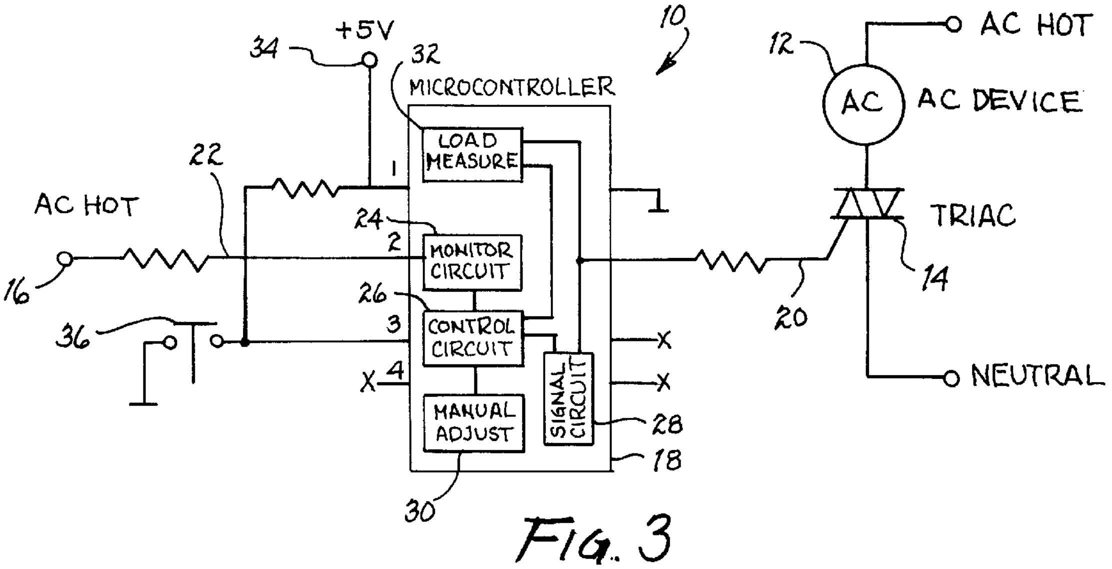
Fig. 3

SYSTEM AND METHOD FOR CONTROLLING AN ALTERNATING CURRENT (AC) SIGNAL

BACKGROUND OF THE INVENTION

1. Field of the Invention

This invention relates generally to control systems and, more specifically, to a system and method for controlling an Alternating Current (AC) signal by utilizing cycle counting to supply a specific number of cycles of an AC signal to a device power by the AC signal.

2. Description of the Prior Art

Currently, in order to control the AC signal to an AC powered device, and hence alter the speed and/or energy supplied to the AC powered device, two methods are normally used. The first method is to control the firing angle of the AC waveform. As shown in FIG. 1, by changing the angle at which the AC line voltage is supplied, the AC powered device is able to be driven at full power or any other level between full power and zero. The problem with controlling the firing angle is that the sudden "clipping" of the AC waveform is very harsh to the AC powered device. The harshness of the "clipping" dramatically reduces the lifetime of the AC powered device. Furthermore, the sudden "clipping" of the AC waveform generates electrical noise. The electrical noise, if severe enough, may hamper the operation of sensitive electrical equipment which may be operating nearby.

The second method used to control the AC signal and hence the speed and/or energy supplied to the AC powered device, is to vary the frequency of the AC waveform that is supplied to the AC powered device. The problem with this method is that the electronics involved in generating high power AC waveforms with varying frequencies is very complex and expensive to build and maintain. For this reason, this method is used extensively in industrial applications and has very little commercial value.

Therefore, a need existed to provide an improved system and method for controlling the AC signal to AC powered devices. The improved system and method must be able to adjust the AC signal to the AC powered device without the harshness of clipping the AC waveform. The improved system and method must also be able to adjust the AC signal without generating significant electrical noise. This will aid in the reduction of interference to sensitive electrical equipment which may be operating nearby. The improved system and method must be simple to implement. The improved system and method must be inexpensive to build and easy to maintain, thus allowing the improved system and method to have commercial applications.

SUMMARY OF THE INVENTION

In accordance with one embodiment of the present invention, it is an object of the present invention to provide an improved system and method for controlling an AC signal to an AC powered device.

It is another object of the present invention to provide an improved system and method for controlling an AC signal to an AC powered device that is able to adjust the AC signal to the AC powered device without the harshness of clipping the AC waveform.

It is another object of the present invention to provide an improved system and method for controlling an AC signal to an AC powered device that is able to adjust the AC signal without generating significant electrical noise, thereby reducing interference to sensitive electrical equipment which may be operating nearby.

It is still another object of the present invention to provide an improved system and method for controlling an AC signal to an AC powered device that is simple to implement.

It is still a further object of the present invention to provide an improved system and method for controlling an AC signal to an AC powered device that is inexpensive to build and easy to maintain, thereby allowing the improved system and method to have commercial applications.

BRIEF DESCRIPTION OF THE PREFERRED EMBODIMENTS

In accordance with one embodiment of the present invention, a system for controlling an Alternating Current (AC) signal to an AC powered device is disclosed. The system has switching means which are coupled to the AC powered device. The switching means are used for controlling the AC signal supplied to the AC powered device in order to control one or both of the speed and/or energy supplied to the AC powered device. Intelligent control means are provided and are coupled to the switching means. The intelligent control means are used for adjusting the AC signal to the AC powered device by controlling which cycles of the AC signal are sent to the AC powered device via the switching means. The intelligent control means are comprised of monitoring means, control means, and signalling means. The monitoring means are coupled to an AC signal line and are used for monitoring the cycles of the AC signal on the AC signal line. Control means are coupled to the monitoring means. The control means are used for controlling which of the cycles of the AC signal are sent to the AC powered device in order to adjust one or both of the speed and/or energy supplied to the AC powered device. Signaling means are coupled to the control means. The signaling means are used for supplying a control signal to the switching means. The control signal is used to fire the switching means in order to supply the cycles of the AC signal which are required to adjust one or both of the speed and/or energy Supplied to the AC powered device to desired levels.

In accordance with another embodiment of the present invention, a method of providing a system for controlling an AC signal to an AC powered device is disclosed. The method comprises the steps of: providing switching means coupled to the AC powered device for controlling the AC signal supplied to the AC powered device in order to control one or both of the speed and/or energy supplied to the AC. powered device; and providing intelligent control means coupled to the switching means for adjusting the AC signal to the AC powered device by controlling which cycles of the AC signal are sent to the AC powered device via the switching means. The step of providing intelligent control means may further comprise the steps of: providing monitoring means coupled to an AC signal line for monitoring the cycles of the AC signal on the AC signal line by measuring the zero current crossing of the AC signal; providing control means coupled to the monitoring means for controlling which of the cycles of the AC signal are sent to the AC powered device to adjust one or both of the speed and/or energy supplied to the AC powered device; and providing signaling means coupled to the control means for supplying a control signal to the switching means to fire the switching means to supply the cycles of the AC signal which are required to adjust one or both of the speed and/or energy supplied to the AC powered device to desired levels.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 shows the AC waveform of a prior art system which controls the AC signal by "clipping" the AC waveform in order to change the firing angle at which the AC line voltage is supplied.

FIG. 2*a* depicts an AC waveform for a fully powered AC powered device.

FIG. 2*b* depicts an AC waveform under the present invention when the speed and/or energy supplied to the AC powered device is reduced to one-half that of the top level.

FIG. 3 depicts a simplified functional block diagram of the system for controlling an AC signal to an AC powered device of the present invention.

DETAILED DESCRIPTION OF THE PREFERRED EMBODIMENTS

Referring to FIG. 3, a system 10 for controlling an Alternating Current (AC) signal to an AC powered device 12 is shown. The system 10 may be used to control the AC signal to any device that is powered by an AC signal. By controlling the AC signal to the AC powered device 12, the system 10 is able to control the speed and/or energy supplied to the AC powered device. Thus, the system 10 could be used to control the speed of an AC induction motor; the energy supplied to AC powered heating elements such as cook-top heaters, irons, coffee makers, room heaters, etc.; or any of a number of other applications.

The system 10 has a switch 14 which connects an AC power source 16 to the AC powered device 12. The switch 14 is used for controlling the AC signal supplied to the AC powered device 12 by the AC power source 16. In the preferred embodiment of the present invention, the switch 14 is a triac. However, it should be noted that other devices could be used.

A microcontroller 18, powered by a voltage supply 34, is coupled to the switch 14 through a signal line 20. The microcontroller 18 is used to control the firing of the switch 14. By sending a signal over the signal line 20, the microcontroller 18 is able to control the opening and closing of the switch 14. Thus, the microcontroller 18 is able to adjust the speed and or energy supplied to the AC powered device 12 by controlling which cycles of the AC signal are sent to the AC powered device 12 via the switch 14. For example, if the AC powered device 12 is running at full power, all of the cycles of the AC signal are provided to the AC powered device 12 (See FIG. 2*a*). If the speed and/or energy supplied to the AC powered device 12 needs to be reduced by half, the microcontroller 18 signals the switch 14 to supply every other cycle of the AC signal to the AC powered device 12 (See FIG. 2*b*). For a speed and/or energy supply one-third that of full power, one AC cycle is supplied and the next two cycles would be stopped by the microcontroller 18.

A second switch 36 is also coupled to the microcontroller 18. The second switch 36 is used to provide a means to enable and disable the microcontroller 18 and hence the system 10.

The microcontroller 18 has a monitoring circuit 24 which is coupled to the AC signal line 22. The monitoring circuit 24 allows the microcontroller 18 to monitoring the cycles of the AC signal that are on the AC signal line 22. The monitoring circuit 24 monitors the cycles of the AC signal by measuring the zero current crossings of the AC signal.

A control circuit 26 is coupled to the monitoring circuit 24. The control circuit 26 of the microcontroller 18 is used to control which cycles of the AC signal are sent to the AC powered device 12 in order to adjust the speed and/or energy supplied to the AC powered device 12. In operation, the control circuit 26 will send a signal to a signaling circuit 28. The signaling circuit 28 will supply a control signal to the switch 14 over signal line 20. The control signal allows the microcontroller 18 to control the firing of the switch 14. As stated above, by controlling the firing of the switch 14, the microcontroller 18 is able to control which cycles of the AC signal are sent to the AC powered device 12. This allows the microcontroller 18 to adjust the speed and/or energy supplied to the AC induction motor 12 to desired levels.

The microcontroller 18 may have a manual adjustment circuit 30. The manual adjustment circuit 30 would be coupled to the control circuit 26. The manual adjustment circuit 30 would allow an individual using the system 10 to manually set the speed and/or energy supplied to the AC induction motor 12. After a speed and/or energy supply level is inputted, the manual adjustment circuit 30 will send a signal to the control circuit 26 indicating which cycles of the AC signal should be sent to the AC powered device 12 in order to adjust the speed and/or energy supply level of the AC powered device 12 to the desired levels.

The microcontroller 18 may also have a load measuring circuit 32. The load measuring circuit 32 would be used to measure the load being driven by the AC powered device 12. There are many different ways to measure the load of the AC powered device 12. For example, the load measuring circuit 32 may measure the voltage across the switch 14. The voltage generated by the AC powered device 12 is indicative of the load actually be driven by the AC powered device 12 including frictional losses. After measuring the load of the AC powered device 12, the load measuring circuit 32 sends a signal to the control circuit 26. The signal will indicate which cycles of the AC signal need to be provided to the AC powered device 12 in order to adjust the speed and/or energy supply level of the AC powered device 12 to desired levels. The desired level being based on the measured load so that the system 10 will operate at maximum efficiency.

While the invention has been particularly shown and described with reference to preferred embodiments thereof, it will be understood by those skilled in the art that the foregoing and other changes in form, and details may be made therein without departing from the spirit and scope of the invention.

I claim:

1. A system for controlling an Alternating Current (AC) signal to an AC powered device comprising, in combination:

switching means coupled to said AC powered device for controlling said AC signal supplied to said AC powered device to control at least one of speed and energy supplied to said AC powered device; and intelligent control means coupled to said switching means for adjusting said AC signal to said AC powered device by allowing a first predetermined number of cycles of said AC signal to be sent to said AC powered device via said switching means and for blocking a second predetermined number of cycles of said AC signal from being sent to said AC powered device to control said at least one of speed and energy supplied to said AC powered device by a proportionate amount, said intelligent control means comprising:

monitoring means coupled to an AC signal line for monitoring said cycles of said AC signal on said AC signal line;

control means coupled to said monitoring means for controlling which of said cycles of said AC signal are sent to said AC powered device to adjust said at least one of said speed and energy supplied to said AC powered device; and signaling means coupled to said control means for supplying a control signal to said switching means to fire said switching means to supply said cycles of the AC signal which are required to adjust said at least one of said speed and energy supplied to said AC powered device to desired levels.

2. A system for controlling an AC signal to an AC powered device in accordance with claim 1 further comprising power supply means coupled to said intelligent control means for supplying an operational voltage to said intelligent control means.

3. A system for controlling an AC signal to an AC powered device in accordance with claim 1 further comprising enabling means coupled to said intelligent control means for activating and deactivating said intelligent control means.

4. A system for controlling an AC signal to an AC powered device in accordance with claim 1 wherein said intelligent control means comprises:

monitoring means coupled to an AC signal line for monitoring said cycles of said AC signal on said AC signal line;

control means coupled to said monitoring means for controlling which of said cycles of said AC signal are sent to said AC powered device to adjust said at least one of said speed and energy supplied to said AC powered device; and signaling means coupled to said control means for supplying a control signal to said switching means to fire said switching means to supply said cycles of the AC signal which are required to adjust said at least one of said speed and energy supplied to said AC powered device to desired levels.

5. A system for controlling an AC signal to an AC powered device in accordance with claim 1 wherein said intelligent control means further comprises adjustment means coupled to said control means for allowing an individual to manually control which of said cycles of said AC signal are provided to said AC powered device to adjust said at least one of said speed and energy supplied to said AC powered device to said desired levels.

6. A system for controlling an AC signal to an AC powered device in accordance with claim 1 wherein said intelligent control means further comprises measuring means coupled to said switching means and to said control means for measuring a load of said AC powered device and for sending a signal to said control means to adjust which of said cycles of said AC signal are provided to said AC powered device to adjust said at least one of said speed and energy supplied to said AC powered device based on said measured load.

7. A system for controlling an AC signal to an AC powered device in accordance with claim 1 wherein said intelligent control means monitors said cycles of said AC signal by measuring zero current crossing of said AC signal.

8. A system for controlling an AC signal to an AC powered device in accordance with claim 1 wherein said switching means is a triac.

9. A system for controlling an AC signal to an AC powered device in accordance with claim 1 wherein said intelligent control means is a microcontroller.

10. A system for controlling an AC signal to an AC powered device in accordance with claim 1 wherein said AC powered device is an AC induction motor.

11. A system for controlling an AC signal to an AC powered device comprising, in combination:

switching means coupled to said AC powered device for controlling said AC signal supplied to said AC powered device to control at least one of speed and energy supplied to said AC powered device; and intelligent control means coupled to said switching means for adjusting said AC signal to said AC powered device by allowing a first predetermined number of cycles of said AC signal to be sent to said AC powered device via said switching means and for blocking a second predetermined number of said cycles of said AC signal from being sent to said AC powered device for controlling said at least one of speed and energy supplied to said AC powered device by a proportionate amount, said intelligent control means comprising:

monitoring means coupled to an AC signal line for monitoring said cycles of said AC signal on said AC signal line;

control means coupled to said monitoring means for controlling which of said cycles of said AC signal are sent to said AC powered device to adjust said at least one of said speed and energy supplied to said AC powered device; and signaling means coupled to said control means for supplying a control signal to said switching means to fire said switching means to supply said cycles of said AC signal which are required to adjust said at least one of said speed and energy supplied to said AC powered device to desired levels;

power supply means coupled to said intelligent control means for supplying an operational voltage to said intelligent control means; and enabling means coupled to said intelligent control means for activating and deactivating said intelligent control means.

12. A system for controlling an AC signal to an AC powered device in accordance with claim 11 wherein said intelligent control means further comprises adjustment means coupled to said control means for allowing an individual to manually control which of said cycles of said AC signal are provided to said AC powered device to adjust said at least one of said speed and said energy supplied to said AC powered device.

13. A system for controlling an AC signal to an AC powered device in accordance with claim 11 wherein said intelligent control means further comprises measuring means coupled to said switching means and to said control means for measuring a load of said AC powered device and for sending a signal to said control means to adjust which of said cycles of said AC signal are provided to said AC powered device to adjust said at least one of said speed and said energy supplied to said AC powered device based on said measured load.

14. A method of providing a system for controlling an AC signal to an AC powered device comprising the steps of:

providing switching means coupled to said AC powered device for controlling said AC signal supplied to said AC powered device to control at least one of speed and energy supplied to said AC powered device; and providing intelligent control means coupled to said switching means for adjusting said AC signal to said AC powered device by allowing a first predetermined number of cycles of said AC signal to be sent to said AC powered device via said switching means and for blocking a second predetermined number of cycles of said AC signal from being sent to said AC powered device to control said at least one of speed and energy supplied to said AC powered device.

15. The method of claim 14 further comprising the step of providing power supply means coupled to said intelligent control means for supplying an operational voltage to said intelligent control means.

16. The method of claim 14 further comprising the step of providing enabling means coupled to said intelligent control means for activating and deactivating said intelligent control means.

17. The method of claim 14 wherein said step of providing intelligent control means further comprises the steps of:

providing monitoring means coupled to an AC signal line for monitoring said cycles of said AC signal on said AC signal line by measuring zero current crossing of said AC signal;

providing control means coupled to said monitoring means for controlling which of said cycles of said AC signal are sent to said AC powered device to adjust said at least one of said speed and energy supplied to said AC powered device; and providing signaling means coupled to said control means for supplying a control signal to said switching means to fire said switching means to supply said cycles of said AC signal which are required to adjust said at least one of said speed and energy supplied to said AC powered device to desired levels.

18. The method of claim 17 wherein said step of providing intelligent control means further comprises the step of providing adjustment means coupled to said control means for allowing an individual to manually control which of said cycles of said AC signal are provided to said AC powered device to adjust said at least one of said speed and energy supplied to said AC powered device to said desired levels.

19. The method of claim 17 wherein said step of providing intelligent control means further comprises the step of providing measuring means coupled to said switching means and to said control means for measuring a load of said AC powered device and for sending a signal to said control means to adjust which of said cycles of said AC signal are provided to said AC powered device to adjust said at least one of said speed and energy supplied to said AC powered device based on said measured load.

20. The method of claim 14 wherein said step of providing switching means further comprises the step of providing a triac.

* * * * *